United States Patent [19]
Andrews et al.

[11] Patent Number: 5,553,293
[45] Date of Patent: Sep. 3, 1996

[54] INTERPROCESSOR INTERRUPT PROCESSING SYSTEM

[75] Inventors: Lawrence P. Andrews; Baiju D. Mandalia, both of Boca Raton; Oscar E. Ortega, Miami Beach; John C. Sinibaldi, Pompano Beach; Kevin B. Williams, North Lauderdale, all of Fla.; Christopher D. Touch, Augusta, Ga.

[73] Assignee: International Business Machines Corporation, Armonk, N.Y.

[21] Appl. No.: 353,016
[22] Filed: Dec. 9, 1994
[51] Int. Cl.⁶ ................................................. G06F 13/24
[52] U.S. Cl. ........................................................ 395/734
[58] Field of Search ............................... 395/733, 736, 395/739, 741, 742, 859, 868, 734

[56] References Cited

U.S. PATENT DOCUMENTS

| | | | |
|---|---|---|---|
| 4,080,649 | 3/1978 | Calle et al. | 364/200 |
| 4,156,796 | 5/1979 | O'Neal et al. | 178/3 |
| 4,188,665 | 2/1980 | Nagel et al. | 364/200 |
| 4,604,500 | 8/1986 | Brown et al. | 379/269 |
| 4,646,232 | 2/1987 | Chang et al. | 364/200 |
| 4,648,029 | 3/1987 | Cooper et al. | 364/200 |
| 4,701,845 | 10/1987 | Andreasen et al. | 364/200 |
| 4,718,008 | 1/1988 | Chang et al. | 364/300 |
| 4,736,319 | 4/1988 | DasGupta et al. | 364/200 |
| 4,751,634 | 6/1988 | Burrus, Jr. et al. | 364/200 |
| 4,768,149 | 8/1988 | Konopik et al. | 395/867 |
| 4,833,598 | 5/1989 | Imamura et al. | 395/650 |
| 4,901,231 | 2/1990 | Bishop et al. | 364/200 |
| 4,975,828 | 12/1990 | Wishneusky et al. | 364/200 |
| 4,980,820 | 12/1990 | Youngblood | 364/200 |
| 5,218,680 | 6/1993 | Farrell et al. | 395/325 |
| 5,283,904 | 1/1994 | Carson et al. | 364/200 |
| 5,367,689 | 11/1994 | Mayer et al. | 395/733 |

Primary Examiner—Jack B. Harvey
Assistant Examiner—Xuong M. Chung-Trans
Attorney, Agent, or Firm—Richard A. Tomlin; Anthony N. Magistrale; Geoffrey A. Mantooth

[57] ABSTRACT

An interprocessor interrupt hardware unit ("IIU") for processing interrupts between a remote processor and a host processor on a multiprocessor system. The IIU off loads tasks involved in processing interrupts from the operating kernel of the remote processor. Control blocks of interrupt information and commands are stored in Data Random Access Memory (DRAM) by the remote processor. The remote processor sets up a buffer of control block memory addresses in DRAM for the IIU to access to retrieve the control blocks from DRAM. The IIU retrieves a control block and loads the control block into registers. The IIU then issues an interrupt request to the host processor. The host processor receives the interrupt request and reads the registers to obtain the control block. The host processor clears the interrupt request and indicates to the IIU that the interrupt has been processed. The IIU then notifies the remote processor that the interrupt has been processed. The IIU may be programmed to notify the remote processor of completion either by an interrupt or by setting a status flag in the DRAM.

12 Claims, 9 Drawing Sheets

INTERPROCESSOR INTERRUPT PROCESSING SYSTEM

TECHNICAL FIELD OF THE INVENTION

This invention relates to interrupt processing systems for processing interrupts between processors in a data processing system, and more specifically, to a dedicated, programmable hardware processing unit which requires minimum intervention from an interrupt issuing processor to process the interrupt.

BACKGROUND OF THE INVENTION

In a multi-processing system, a group of processors execute a variety of tasks. Task data is transferred between the processors on one or more communications channels so that the processors may integrally process the tasks.

One type of multi-processing system has a host processor and multiple remote processors. The host processor has memory, typically in the form of Data Random Access Memory (DRAM). The remote processors also have memory. Typically each remote processor has its own DRAM, or it may share DRAM with other the remote processors. The remote processors communicate with the host processor on one or more busses.

The host processor commonly performs a central task while the remote processors perform tasks in support of the central task. A remote processor transfers task data to the host processor from the task being executed on the remote processor. To transfer the task data, the remote processor issues an interrupt to the host processor. Upon receiving an interrupt, the host processor reads the task data and informs the remote processor when the host processor is finished reading the task data. The host processor and the interrupting remote processor then resume processing their respective tasks.

In the prior art, a remote processor directly participates in the processing of an interrupt request. Each remote processor has an operating system or kernel. The kernel issues an interrupt request to the host processor. The kernel processes the interrupt request by controlling the format of the interrupt and supplying the host processor with interrupt data. The kernel must also inform tasks executing on the remote processor when the interrupt request has been completed. It is desirable to accomplish the execution of interrupt requests without involving the kernel of a remote processor so that the kernel and its remote processor are free to perform other tasks.

SUMMARY OF THE INVENTION

It is an object of the invention to provide a multi-processor system having a host processor and multiple remote processors connected to the host processor, where each remote processor is associated with an interprocessor interrupt unit which processes interrupts between a remote processor and the host processor independent of the operating system or kernel of the remote processor and the host processor.

A multi-processing system is provided having a host processor and multiple remote processors. The remote processors communicate with the host processor over busses. Each remote processor has an operating system or kernel which controls the operations of the remote processor.

The remote processors communicate information to the host processor by issuing interrupts. A programmable interprocessor interrupt hardware unit is provided for processing interrupts. Each remote processor has an associated interprocessor interrupt unit (IIU) for processing interrupts between the remote processor and the host processor. The IIU off-loads the tasks involved in processing interrupts from the operating kernel of an associated remote processor, eliminating the involvement of the kernel in "housekeeping" chores relating to the interrupts, and thereby maximizing the utilization of the remote processor's operating kernel for processing tasks.

A remote processor provides interrupt information and commands to an IIU in DRAM associated with the remote processor. The IIU retrieves the interrupt information and commands by accessing DRAM memory locations containing the interrupt information. The DRAM memory locations are provided to the IIU in a DRAM buffer created by the remote processor. The IIU loads the retrieved information into general purpose registers.

After retrieving a block of interrupt information, the IIU issues an interrupt request to the host processor. Upon receiving an interrupt request the host processor issues a broadcast read command to receive an interrupt vector from the IIU. The IIU issues the interrupt vector in response to the broadcast read command, where the interrupt vector specifies which remote processor initiated the interrupt and the interrupt type. The host processor then clears the interrupt request and proceeds to read the block of interrupt information from the general purpose registers.

After reading the information, the host processor notifies the IIU that the interrupt has been processed. The IIU notifies the interrupt initiating remote processor that the interrupt has been processed. In order to indicate that the interrupt has been processed the IIU may be programmed to issue an interrupt back to the remote processor or to set a status flag in the DRAM. The IIU indicates whether any errors occurred in processing an interrupt, and generates a high priority error interrupt to the interrupt initiating remote processor to notify the remote processor of an error. The IIU processes all blocks of interrupt information awaiting processing and waits in an idle mode for further interrupt requests from an associated remote processor after all interrupt requests have been processed.

DESCRIPTION OF THE INVENTION

System Architecture

Figure 1:
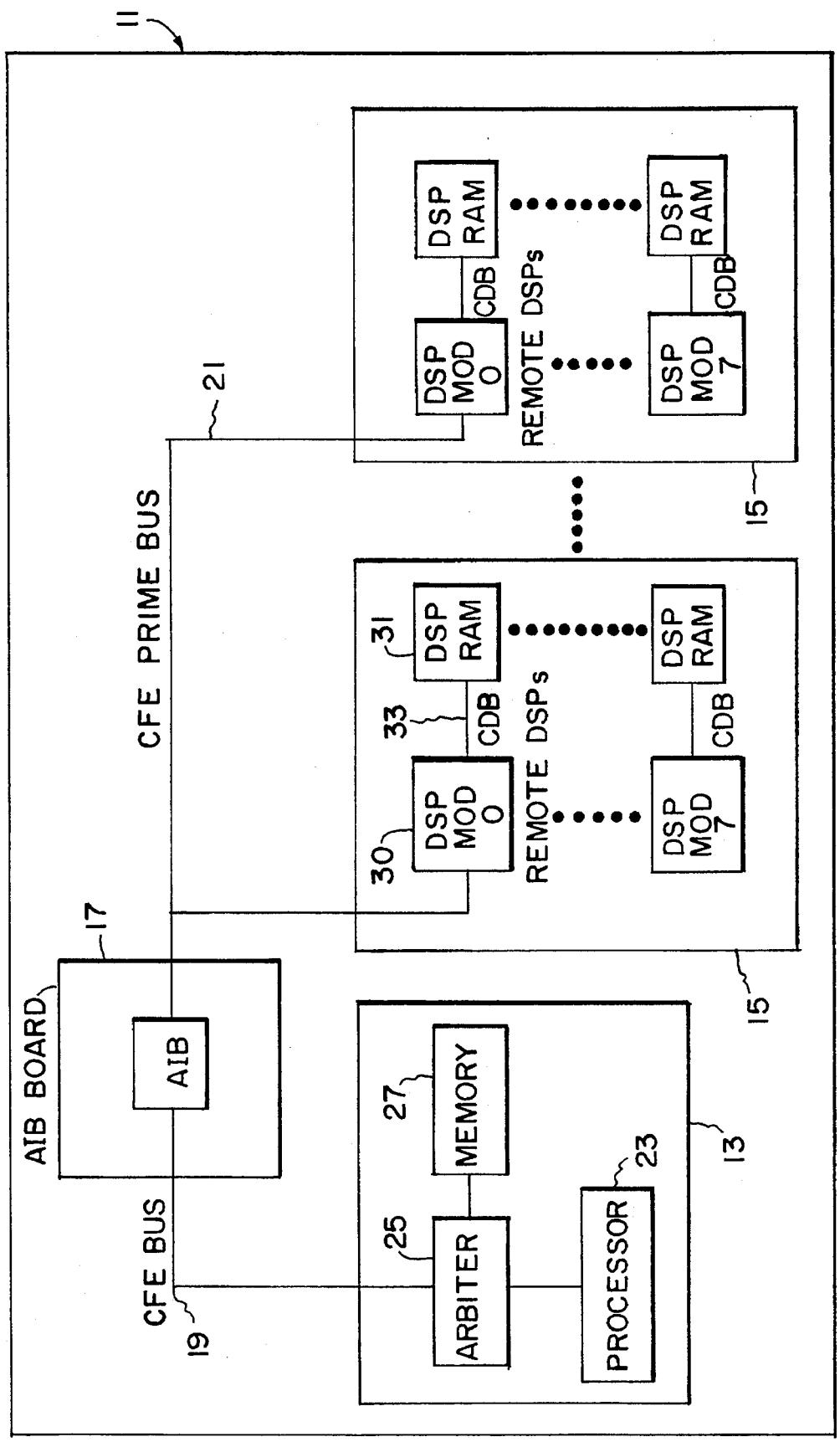
FIG. 1 is a block diagram of a multi-processing system of the present invention in accordance with a preferred embodiment.

In FIG. 1 there is shown a schematic diagram of the overall system architecture of a data processing system 11 upon which the present invention can be practiced. The data processing system 11 includes a host processor card 13 and multiple digital signal processing cards 15. The host processor card 13 is connected to an Application Interface Board (AIB) 17 by a Common Front End (CFE) bus 19. The AIB 17 interfaces to the host processor card 13 with the digital signal processing cards 15. Each digital signal processing card 15 is connected to the AIB 17 by a Common Front End Prime (CFE') bus 21.

The host processor card 13 has a host processor 23 located thereon. In a preferred embodiment of the invention the host processor 23 is an Intel 80960 processor, which is well known in the art. The host processor 23 is connected to a local bus arbiter 25 located on the host processor card 13. The local bus arbiter 25 gives the host processor 23 access to the CFE bus 19 and to the host processor memory 27 located on the host processor card 13. The local bus arbiter 25 also selects the highest priority service request on the CFE bus 19 for processing by the host processor 13.

Figure 2:
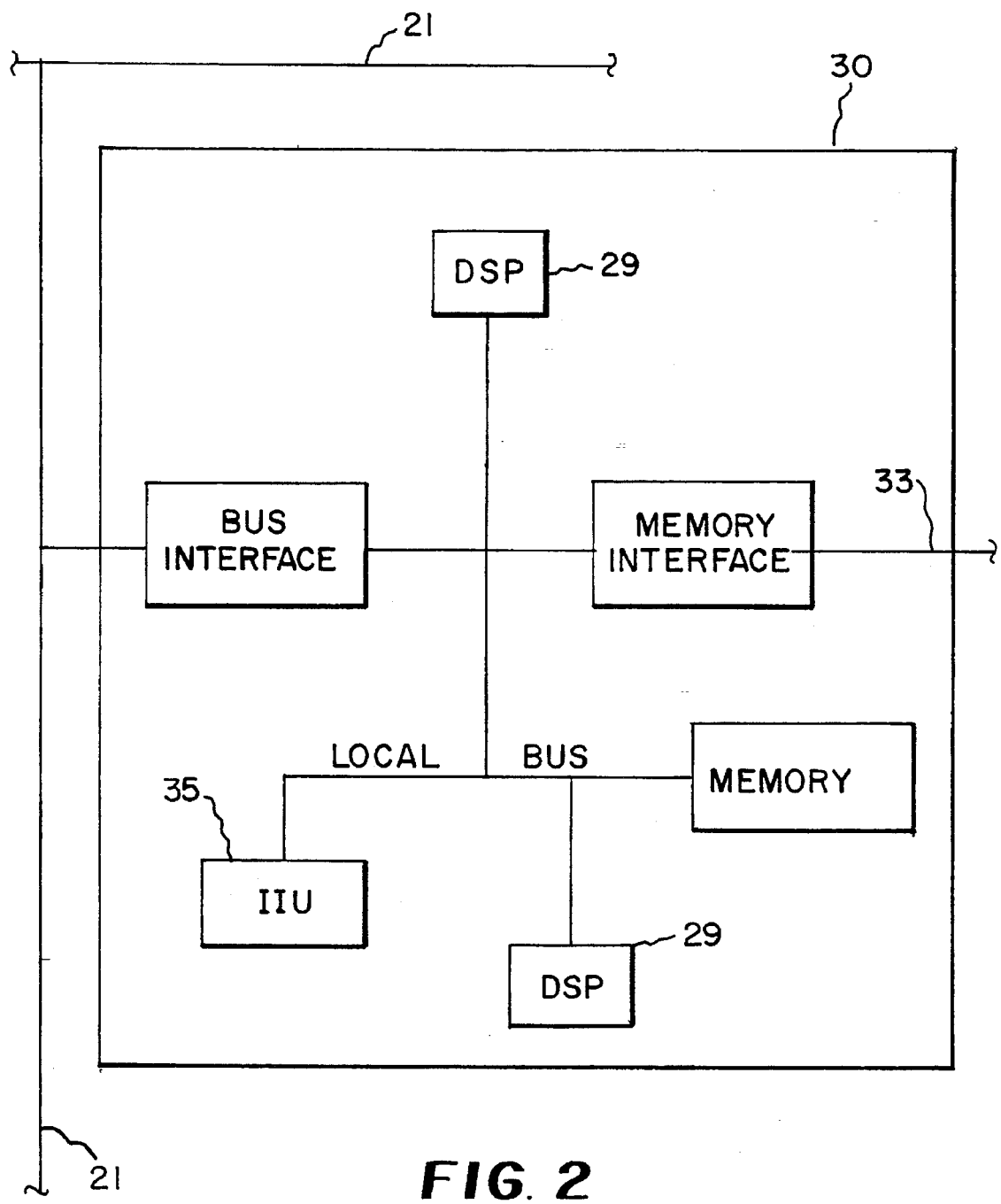
FIG. 2 is a schematic block diagram of a remote processor module.

Referring now to FIGS. 1 and 2, each digital signal processing card 15 supports multiple digital signal processors 29 thereon. The digital signal processors 29 (DSPs) perform processing operations in support of the host processor 23. Each DSP 29 is connected to random access memory 31 (DSP DRAM) by a common data bus 33. In a preferred embodiment, two DSPs 29 form a DSP module 30 which has its own DSP DRAM 31 and connecting common data bus 33. Multiple DSP modules 30, up to eight, are located on each digital signal processing card 15, and multiple digital signal processing cards 15, preferably three, are connected to the CFE' bus 21.

Figure 3:
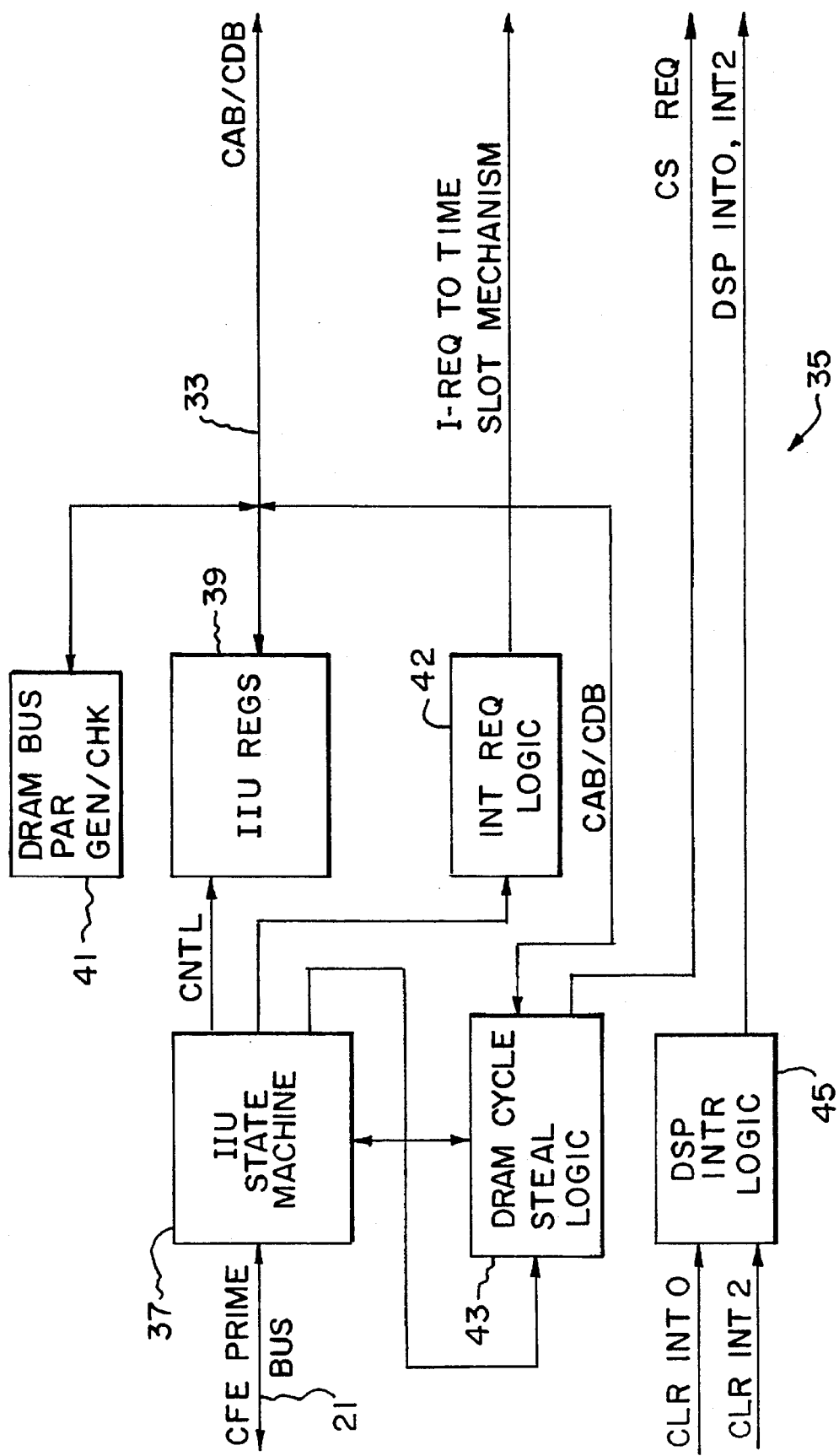
FIG. 3 is a second level block diagram of the interprocessor interrupt unit.

The present invention provides a flexible and programmable hardware Interprocessor Interrupt Unit (IIU) 35 that processes interrupt requests issued by tasks running on the DSPs 29. As shown in FIGS. 2 and 3, an IIU 35 is connected to a DSP 29, the common data bus 33, and the CFE prime bus 21 so that the IIU 35 may communicate with the DSP 29, the DSP DRAM 31, and the host processor 23, respectively. In a preferred embodiment, as shown in FIG. 2, each DSP module 30 has its own IIU 35 which services both DSPs 29 in the module 30.

Referring to FIG. 3, a preferred architecture of the IIU 35 is shown. The IIU 35 has a state machine 37 which performs the central operational logic functions of the IIU 35. The operations of the state machine will be described in more detail below, with reference to FIGS. 5–7. The state machine 37 is connected to the CFE' bus 21 for communication with the host processor 23. The IIU state machine 37 controls IIU registers 39 which retain information for running the IIU 35 and indicating the IIU's status. The IIU registers 39 communicate with the DSP DRAM 31 on the common data bus 33. DRAM bus parity generation and checking 41 is provided to eliminate parity errors between the IIU 35 and the DSP DRAM 31. DRAM cycle steal logic 43 is also provided so the IIU 35 may access the DSP DRAM 31 when the DSPs 29 are not accessing the DSP DRAM 31. DSP Interrupt logic 45 enables interrupts to be issued from the IIU 35 to the DSPs 29, or permits an issued interrupt to be cleared. Interrupt request logic 47 is also provided so that interrupt requests may be issued by the IIU 35 to the host processor 23.

Overview of Operation

The IIU 35 processes interrupt requests issued by tasks running on the DSPs 29 and transmits the interrupt requests to the host processor 23 upon a "broadcast read" command from the host processor 23. The IIU automatically notifies an interrupt initiating DSP 29 of the host processor's acceptance of the interrupt. The IIU enables interrupt requests to be processed with a minimum of DSP invention, freeing the operating kernel of an interrupt initiating DSP of the burden of processing the interrupt request issued by a task being executed by the DSP.

An interrupt request is flexibly processed by the IIU 35. An interrupt request initiating DSP 29 stores interrupt control blocks of data in its DRAM 31 for controlling processing of an interrupt request. The IIU is directed to process the interrupt request according to the data in the interrupt control blocks. Linked memory addresses are provided by the DSP to the IIU for retrieving the control blocks from DSP DRAM in proper order for execution of the interrupt request. The DSP may change the number of control blocks while the IIU is executing the interrupt request, ensuring flexible control of the interrupt request. When the IIU has been halted, the DSP can change the order in which the control blocks are to be processed. Furthermore, the IIU may be halted while processing an interrupt request to insert a high priority interrupt request or to abort the interrupt request by setting the skip bit in this request.

Upon an interrupt request from a task, a DSP 29 initializes the IIU 35, stores interrupt control blocks in DSP DRAM 31 for processing and providing data for the interrupt request, and sets up a circular address queue buffer in DSP DRAM 31 for storing the control block memory addresses the IIU is to process. The IIU sequentially accesses the address entries in the circular queue to access the interrupt control blocks in the order that the control blocks are to be processed. The IIU uses its DRAM cycle steal logic 43 (FIG. 3) to read from and write to the DSP DRAM.

Upon accessing an interrupt control block, the IIU fetches the control block and copies it into general purpose dual port registers in the IIU. The IIU then sends over the busses 19, 21 an interrupt request to the host processor indicating that an interrupt control block is ready to be processed.

In response, the host processor issues over the busses 19, 21 a broadcast read to obtain an interrupt vector from the IIU. The interrupt vector specifies which DSP initiated the interrupt and the interrupt type. The host processor then reads the general purpose dual port registers in the IIU and resets the IIU to turn the interrupt request off. After the host processor completes its read, the host processor indicates to the IIU that the interrupt control block has been processed. The IIU then sets a status flag in the control block or interrupts the DSP to indicate that the control block has been processed.

The IIU subsequently accesses the circular queue again so that the IIU can fetch the next interrupt control block for processing. When the last queue entry has been processed, no further control blocks remain to be processed and the interrupt requests have been completely processed. The IIU then waits for the DSP to initiate another interrupt request. If any errors occur during processing of an interrupt request, the IIU terminates the request and indicates to the requesting DSP that an error has occurred.

IIU Register Description

Figure 4:
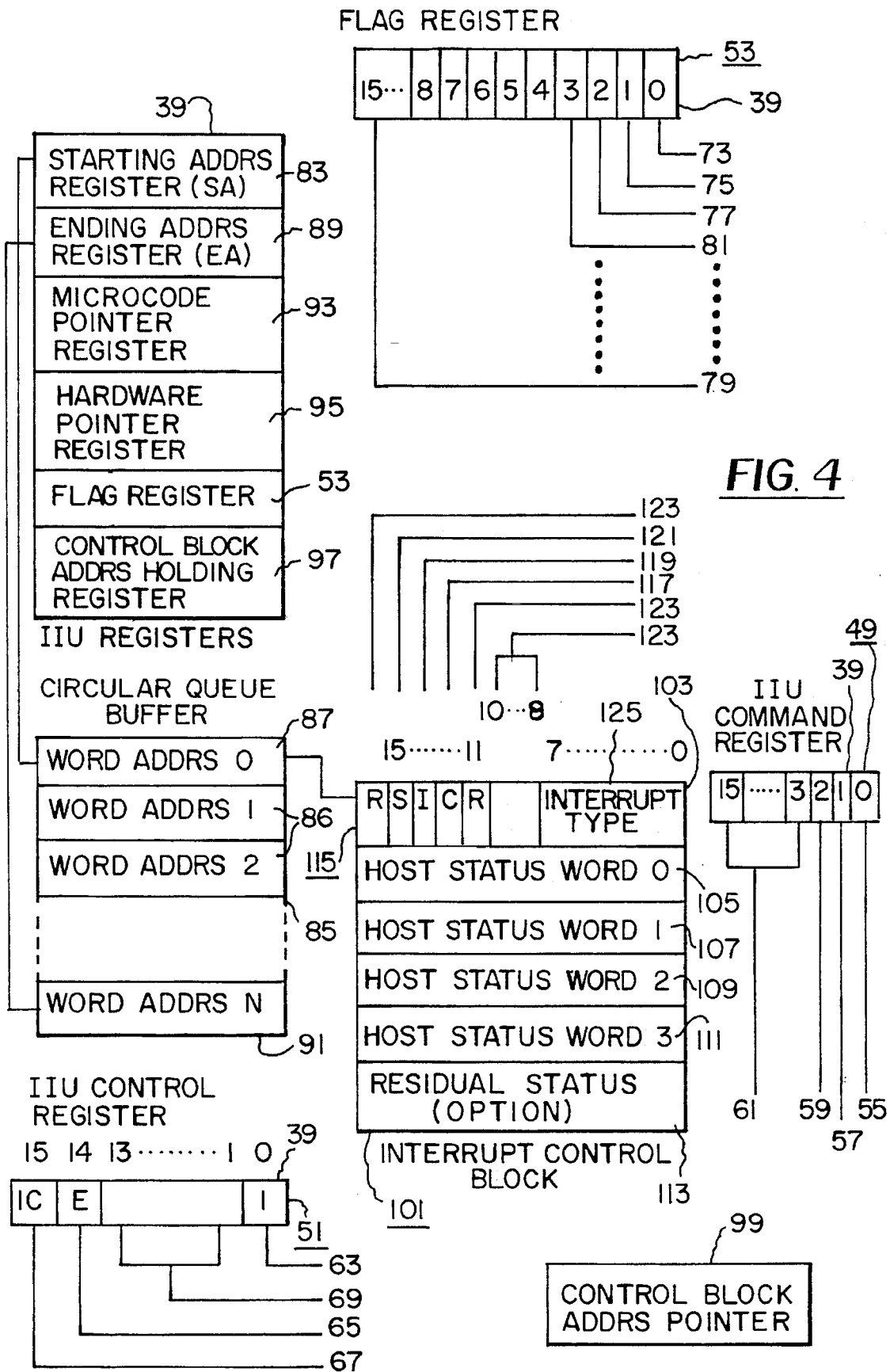
FIG. 4 is a schematic diagram of the IIU registers, and an interrupt control block.

Referring now to FIG. 4, the registers 39 of the IIU will be described. The IIU has 16 bit command, control, and flag registers 49, 51, and 53, which control the operation of the IIU. The command register 49 has a start/-stop bit 55 (bit 0), an IIU disable parity generation bit 57 (bit 1), an IIU disable parity check bit 59 (bit 2), and reserved bits 61 (bits 3–15). The start/-stop bit 55 is used to direct the operation of the IIU, placing the IIU in a running state when the bit is set on and directing the IIU to switch off when the bit is set off. (In discussing bits herein, the format X/-Y indicates that Y is active low.) The start/-stop bit may be set by an interrupt requesting DSP to either initiate or halt processing of an interrupt request, or by the IIU to halt processing when an error is detected. The IIU disable parity generation and check bits 57 and 59 may be set to disable parity generation and checking on read and write operations between the IIU 35 and the DSP DRAM 31.

The control register 51 has an interrupt request bit 63 (bit 0), an error on access slave read operation bit 65 (bit 14), an interrupt processing complete bit 67 (bit 15), and reserved bits 69 (bits 1–13). The interrupt request bit 63 is used by the IIU to issue an interrupt request to the host processor during normal processing. A DSP may also set the interrupt request bit 63 to manually set a communications interrupt request. After the host processor receives the interrupt request, the host processor resets the interrupt request bit 63 to turn the interrupt request off. The error on access slave read operation bit 65 is set by the host processor if an error occurs when the host processor reads the interrupt vector or the associated interrupt control block. The bit 65 will indicate to the IIU that an error has occurred. The interrupt processing complete bit 67 is set by the host processor upon successful completion of processing an interrupt control block of data. The bit 67 indicates to the DSP that the interrupt control block was processed successfully.

The flag register 53 indicates the status of an interrupt request. The flag register 53 has a complete bit on bit 73 (bit 0), a host processor read error bit 75 (bit 1), a common data bus parity error bit 77 (bit 2), a run/-halt bit 79 (bit 15), and reserved bits 81 (bits 3-14). The complete bit on bit 73 is set by the IIU when the IIU detects that an interrupt control block has already been processed, either by a previously completed interrupt request or from an incorrect setting by the DSP. The IIU will send an error interrupt to the DSP if the complete bit on bit 73 is set. The host processor read error bit 75 is used to indicate that a parity error occurred in the host processor's read of an interrupt control block. The IIU will set the host processor read error bit 75 in response to the host processor 23 setting the access slave read operation bit 65 of the IIU control register 51. The IIU will then drop the interrupt request to the host processor and will generate an error interrupt to the interrupt requesting DSP. The common data bus party error bit 77 is set when the IIU detects a parity error on a read from the DSP DRAM 31. Upon the common data bus parity error bit 77 being set, the IIU generates an error interrupt to the DSP that requested the interrupt. The run/-halt bit 79 is set by the IIU to indicate whether the IIU hardware is processing an interrupt request or is in a halt mode.

The IIU has address and pointer registers which enable the IIU to process an interrupt request. A starting address register 83 stores the DSP DRAM memory address of the beginning of a circular queue 85 so that the IIU can locate the initial interrupt control block pointed to by the address located in the initial queue entry. The circular queue 85 is a buffer of contiguous control block address entries 86 which are sequentially accessed by the IIU beginning at the starting address 87 of the queue. The DSP sets up the circular queue in the DSP DRAM upon initiating an initial interrupt request. The interrupt requesting DSP writes the starting address 87 of the circular queue 85 into the starting address register 83 when the DSP initializes the IIU for processing the interrupt request.

The IIU also has an ending address register 89 for storing the DSP DRAM memory address of the end address 91 of the circular queue 85 so the IIU can determine when to wrap back around the circular queue 85 to the starting address 87. The DSP adds new queue entries as new interrupt control blocks are created during interrupt requests. When the DSP reaches the end 91 of the circular queue 85 it wraps around to the beginning 87, replacing previous control block addresses with new control block addresses. Upon reaching the ending address 91 of the queue 85 specified in the ending address register 89, the IIU loops back to the starting address 87 of the queue 85 to process the newly added queue elements.

A microcode pointer register 93 and a hardware pointer register 95 are used to track the location of the DSP and the IIU in the circular queue as the interrupt request is processed. The microcode pointer register 93 contains the address of the circular queue entry which holds the address of the interrupt control block most recently implemented by the DSP. As the DSP makes an interrupt request by writing the control block into the DSP DRAM and adding another queue entry into the circular queue, the DSP writes the DSP DRAM address of the new queue entry into the microcode pointer register 93. The hardware pointer register 95 contains the address of the circular queue entry which holds the address of the control block currently being processed by the IIU. The IIU updates the address of the queue entry in the hardware pointer as the IIU sequentially proceeds through the circular queue entries.

The IIU determines whether all interrupt requests have been processed to completion by comparing the hardware pointer register 95 with the microcode pointer register 93 prior to processing a next control block. The hardware pointer register 95 will have the same queue address value as the microcode pointer register 93 when the IIU has processed all of the control blocks implemented by the DSP, indicating that processing is complete.

The IIU further has a queue element address holding register 97 and a control block address pointer 99 which enable the IIU to communicate with the interrupt control blocks. The queue element address holding register 97 contains a copy of the current interrupt control block address in DSP DRAM. The control block address is copied from the queue entry at which the hardware pointer register 95 is pointed to in the queue element address holding register 97. The IIU uses the queue element address holding register 97 to generate the DSP DRAM address of the current control block so that the IIU can write to the control block in the DSP DRAM.

The control block address pointer 99 also contains a copy of the current interrupt control block address copied from the circular queue entry at which the hardware pointer register 95 is pointed. The IIU uses the control block address pointer 99 to generate the address for fetching the control block from DSP DRAM.

An interrupt control block 101 is comprised of five data words which are located in sequential memory addresses in the DSP DRAM. The IIU fetches the control block by sequentially loading each word into the general dual port registers in the IIU. The IIU reads the control pointer register 99 to obtain the address of the next word to be fetched, and then increments the control pointer register 99 so that the address of the subsequent word to be fetched is located in the control pointer register.

Interrupt Control Block Description

Referring still to FIG. 4, the interrupt control block 101 used to control the interrupt request will now be described.

Each interrupt control block 101 contains all of the information that an interrupt initiating DSP 29 wishes the host processor 23 to read. The DSP kernel organizes interrupt control blocks 101 in response to an interrupt request from a task running on the DSP, and writes the control blocks 101 into random locations in the DSP DRAM. The DSP sets up the circular queue buffer 85 to store the memory addresses of the interrupt control blocks 101 in DSP DRAM in contiguous locations in the DSP DRAM.

Each interrupt control block 101 is comprised of five sixteen bit words which are stored in consecutive memory locations in the DSP DRAM. The five words are designated as word zero 103, word one 105, word two 107, word three 109, and word four 111.

Word zero 103 of each control block 101 contains status and command information for controlling the processing of the control block, and is used for communication between the interrupt initiating DSP, the IIU, and the host processor.

Each interrupt control block word zero 103 has a first part 115 (bits 8–15) which is used to communicate with the IIU. The IIU reads from the first part 115 of word zero 103 to obtain processing commands from the control block 101, and writes to the first part 115 to return processing status information to the DSP.

The first part 115 of the word zero 103 of a control block 101 is comprised of a complete bit 117 (bit 12), an interrupt bit 119 (bit 13), a skip bit 121 (bit 14), and reserved bits 123 (bits 8–11 and 15). The complete bit 117 is a status bit that indicates that the control block 101 has been processed by the IIU without an error. The IIU sets the complete bit 117 when the host processor has completed reading the control block from the general purpose registers and has set the interrupt processing complete bit 67 in the control register 51 of the IIU. The interrupt bit 119 is a command bit which, when set, instructs the IIU to issue a processing complete interrupt (a level 2 interrupt) to the DSP upon successful completion of processing the control block 101. If the interrupt bit 119 is set, the IIU first sets the complete bit to indicate that the control block was successfully processed, and then issues a processing complete interrupt by way of the interrupt logic 45 (FIG. 3). The skip bit 121 is set by the DSP to indicate to the IIU that the control block 101 is valid but is not to be processed. Upon encountering a control block to be skipped, the IIU sets the complete bit 117 in the control block to indicate that the control block has been processed and then goes to the next entry in the circular queue 85. Note that the skip bit is also set in word zero.

Each interrupt control block word zero 103 also has a second part 125 (bits 0–7). The second part 125 of word zero 103 is an interrupt vector to be communicated to the host processor. The interrupt vector indicates which DSP issued the interrupt request and the interrupt type. The interrupt vector is gated out onto the CFE' bus 21 when the host processor does a broadcast read in response to the interrupt request.

Words one, two, three, and four 105, 107, 109 and 111 of each control block 101 contain status information to be passed on to the host processor for the host processor to read in response to an interrupt request.

In another embodiment, each interrupt control block 101 also includes a residual word 113. The residual word 113 is an image of word zero 103 of the control block which enables the DSP to set the skip bit 121 without having to halt the IIU. The DSP writes over word zero of the control block to set the skip bit. If the interrupt control block does not have a residual word 113, then the IIU must be halted before the DSP can set the skip bit 121 in order for the DSP to determine if the complete bit 117 has been set so that the DSP will not erase the complete bit by writing over word zero. However, if the interrupt control block has a residual word, then the IIU Writes to the residual word while the DSP writes to word zero of the control block. The complete bit is set in the residual word for the DSP task to read so that the DSP may freely write over word zero of the control block without having to halt the IIU.

Operation of the IIU

Figure 5:
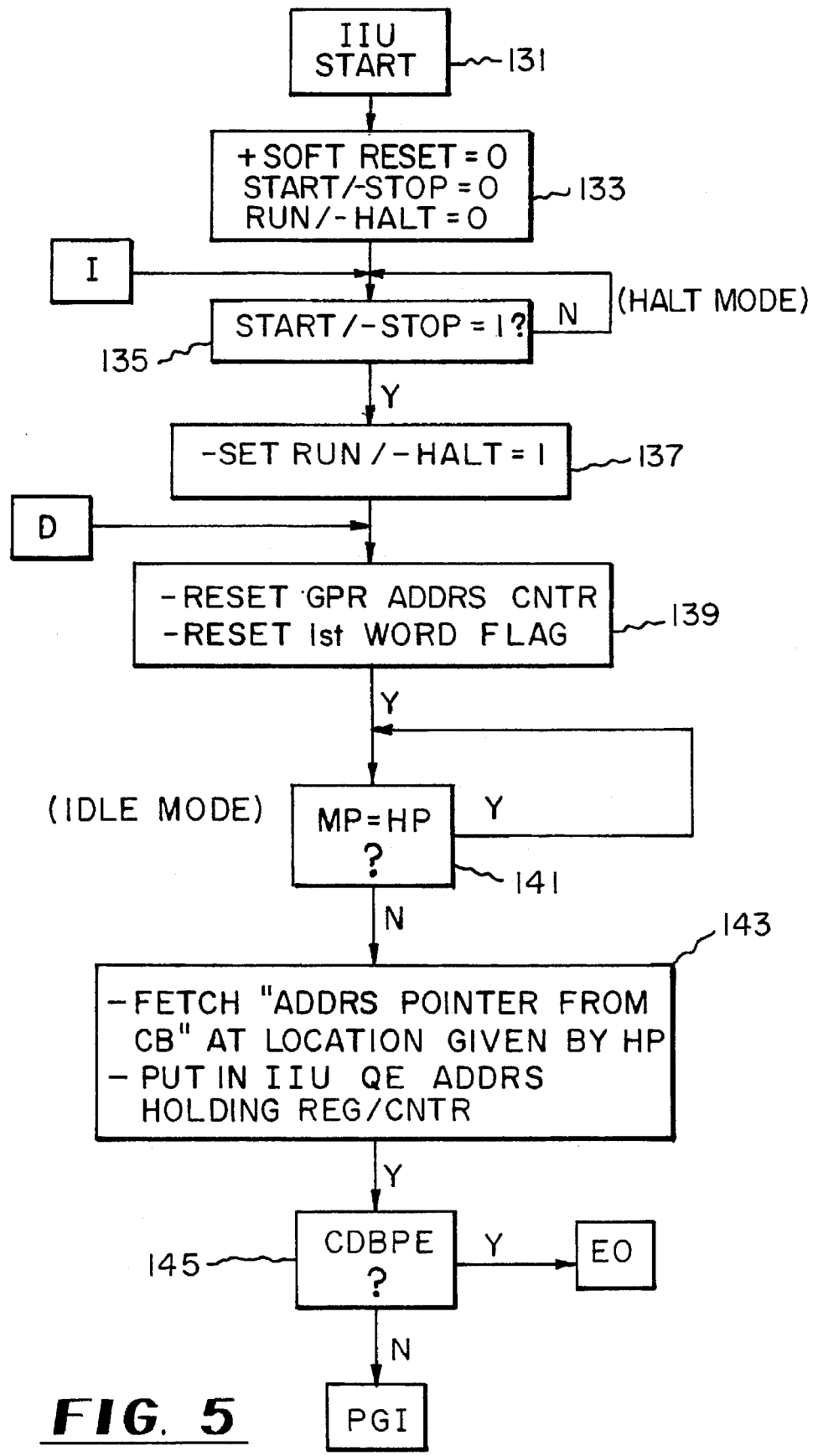
FIG. 5 is a first page of a flow chart showing the method of operation of the IIV.
Figure 6:
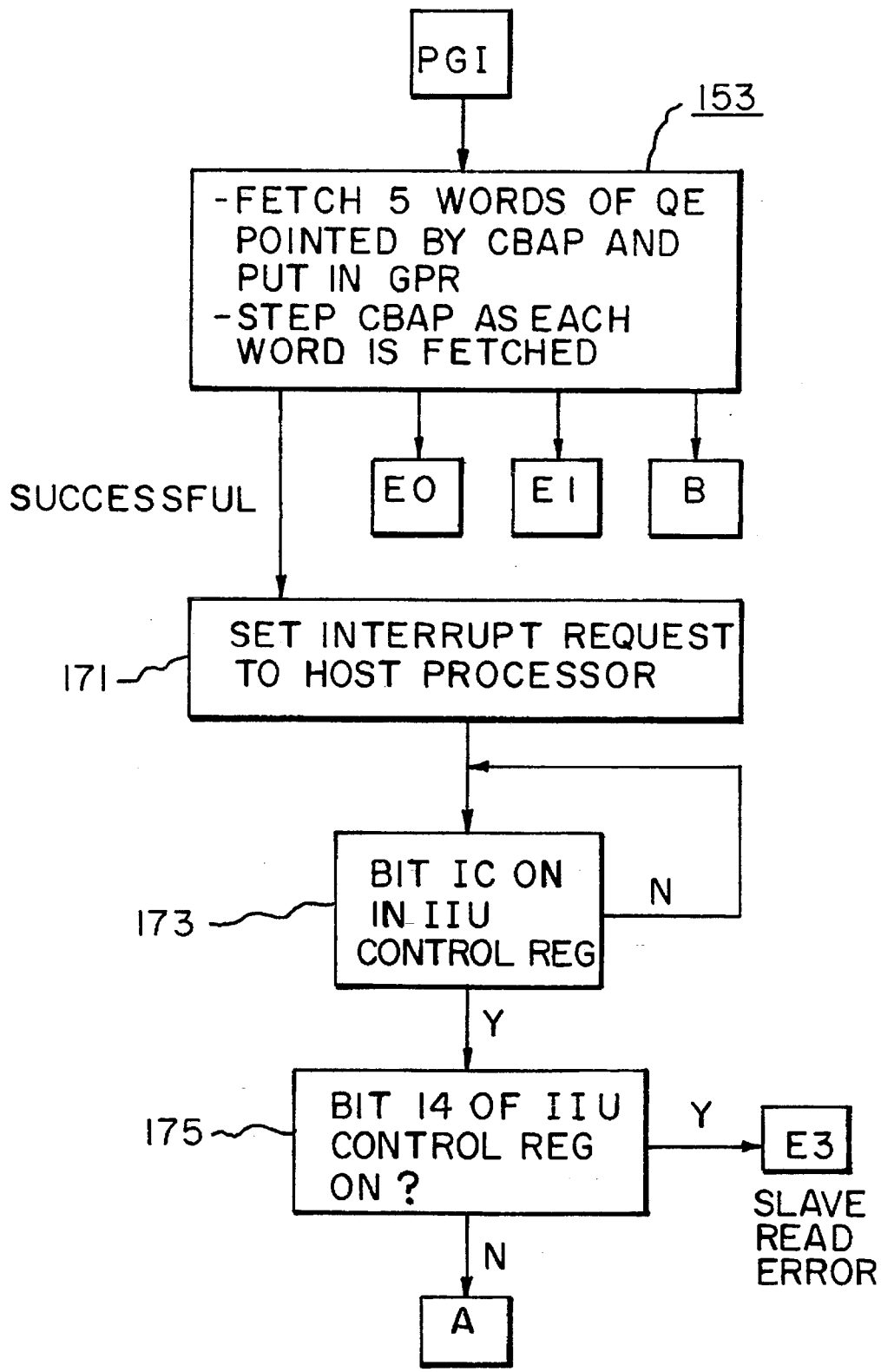
FIGS. 6 and 6A are a second page of a flow chart showing the method of operation of the IIU.
Figure 7:
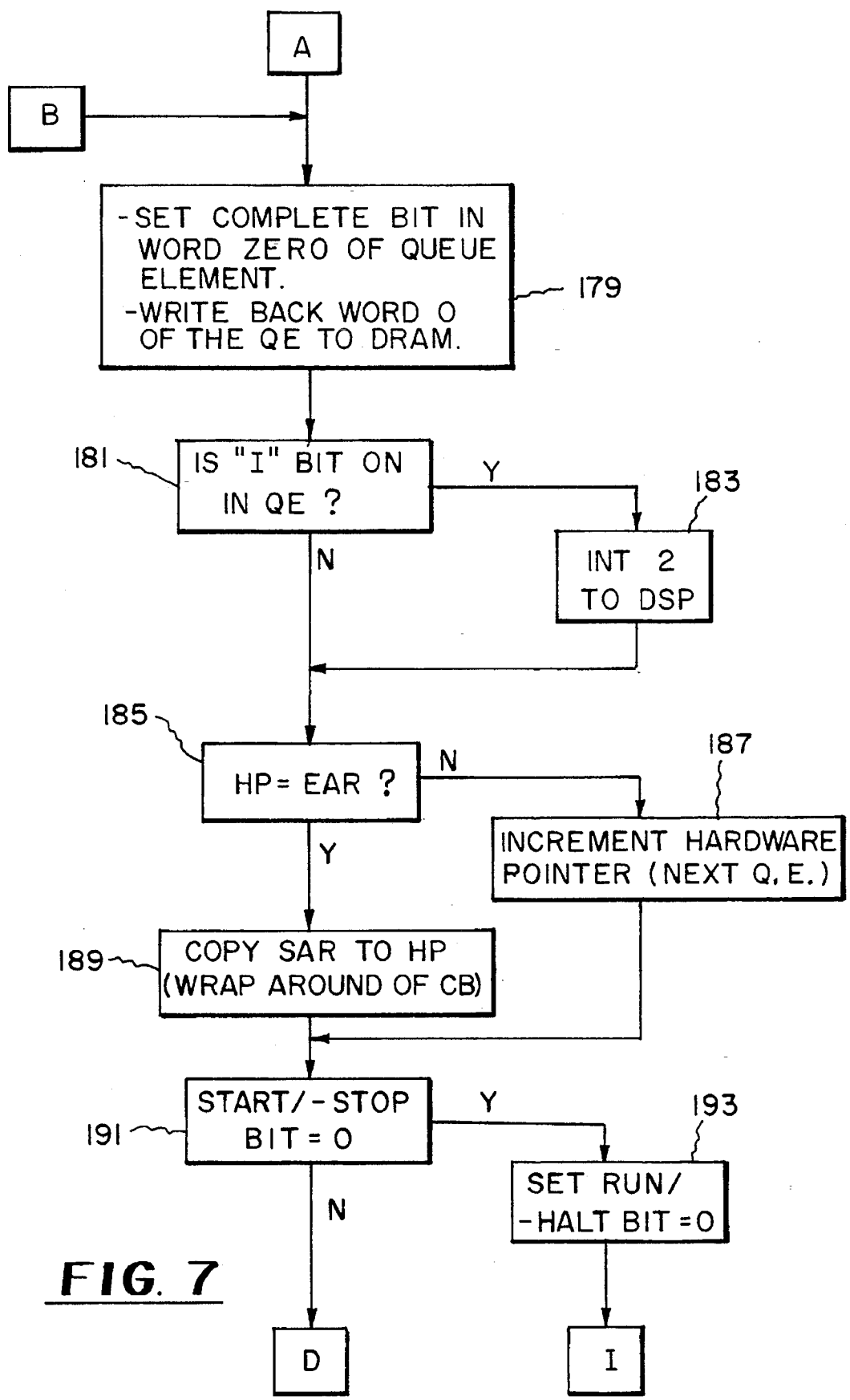
FIGS. 7 and 7A are a third and final page of a flow chart showing the method of operation of the IIU.

Referring now to FIGS. 5–7, the operation of the IIU will be described. FIGS. 5–7 show flow charts of the operation of the IIU itself. Operations of the interrupt initiating DSP and the host processor are not shown in the flow charts, however, these operations will be described in relation to the operation of the IIU.

Referring to FIG. 5, the IIU is started in step 13 1 in response to being powered on or reset. The IIU resets the start/-stop bit 55 in the command register 53, and the general purpose registers, step 133. The reset clears the general purpose registers, and sets the start/-stop bit and the run/-halt bit to zero to place the IIU in a halt mode and to indicate that the IIU is awaiting an interrupt request from a task running on the DSP.

When the DSP receives an interrupt request from a task, the DSP prepares the DSP DRAM and the IIU registers to process the interrupt request. The DSP sets up the circular queue buffer 85 in the DSP DRAM and creates queue entries in the circular queue buffer by placing the DSP DRAM memory address locations of interrupt control blocks into the queue buffer. The DSP sets up the IIU starting address register 83 and ending address register 89 by placing the DSP DRAM starting address 87 and ending address 91 of the circular queue buffer 85 into the registers 83 and 89, respectively. The DSP also sets the hardware pointer register 95 so that the hardware pointer register contains the starting address 87 of the circular queue 85. The microcode pointer register 93 is incremented to contain the address of the next queue entry each time the DSP adds a control block so that the microcode register contains the circular queue address of the last interrupt control block entry placed into the queue 85. The DSP then sets the start/stop bit 55 in the command register 49 to one to initiate an interrupt request to the IIU.

The IIU determines whether an interrupt request has been initiated by a DSP by determining whether the start/-stop bit 55 has been set to one, step 135. If the result of step 135 is NO, then the IIU loops back to determine again whether the start/-stop bit has been set to one, step 135. The IIU will loop continuously in this manner in a halt mode until a DSP initiates an interrupt request by setting the start/-stop bit to one. If the result of step 135 is YES, then the IIU sets the run/halt bit 79 in the flag register 53 to one to indicate that an interrupt request is being processed by the IIU, step 137.

After setting the run/-halt bit 79 in step 137, the IIU resets the general purpose register, the address counters and the first word flag, step 139. The first word flag is a latch in the IIU state machine which is set after the first word of an interrupt control block is fetched so that subsequent words of the control block may be fetched without checking for status or command bits. The general purpose register stores a control block fetched from the DSP DRAM in the IIU, and is cleared to erase any information left in the registers. The address counters that are cleared are the queue element address holding register 97 and the control block address pointer 99.

The IIU then checks to see if any interrupt control blocks are waiting to be processed. The IIU compares the queue address in the hardware pointer register 95 with the queue address in the microcode pointer register 93 to determine if the queue addresses are the same, step 14 1. If the remit of step 141 is YES, then no interrupt control block is awaiting processing. The IIU then loops back to determine again whether an interrupt control block is awaiting processing. The IIU will loop continuously in this manner entering an idle mode until the IIU finds different queue addresses in the hardware pointer register and the microcode pointer register.

If the result of step 141 is NO (the hardware pointer and the microcode pointer do not have identical queue addresses stored therein), then an interrupt control block is awaiting processing. The IIU fetches the interrupt control block DSP DRAM address stored in the circular queue buffer 85 at the queue entry pointed to by the hardware pointer register 95, and stores the fetched address in the IIU queue element address holding register 97 and in the IIU control block address pointer 99, step 143. The IIU then checks to see if any parity errors occurred on the common data bus 33 when the interrupt control block address was fetched from the circular queue buffer 85, step 145.

If the result of step 145 is YES, then the IIU enters errors routine E0 (See FIG. 7A) to report a common data bus parity error. The IIU sets the common data bus parity error bit 77 in the IIU flag register 53 to indicate that a common data bus parity error occurred, step 147. The IIU then resets the run/-halt bit 79 in the flag register 53 and the start/-stop bit 55 in the command register 49, step 149. The reset start/-stop bit 55 causes the IIU to stop processing and enter the halt mode described above and the reset run-/halt bit 79 indicates that the IIU has been halted. An error interrupt (level 0 interrupt) is then sent to the DSP, step 151, to indicate to the DSP that an error has occurred.

Returning to FIG. 5, if the result of step 145 is NO (no parity errors occurred in step 141 ), then IIU proceeds to sequentially fetch the words of the interrupt control block and loads the words of the control block into the IIU general purpose registers, step 153 (FIG. 6). Step 153 is a fetch routine 155, shown in more detail in FIG. 6A, to fetch the interrupt control block. The IIU fetches each word using a fetch loop which fetches the word located at the address in the control block address pointer (CBAP) 99, writes the word into the IIU general purpose registers, and then increments the control block address pointer (CBAP) to point to the next word of the control block, step 157. The control block address pointer 99 is stepped through sequential memory address locations to retrieve the sequentially addressed words of the control block.

After each word is fetched the IIU determines whether a common data bus parity error occurred when the word was fetched, step 159. If the result of step 159 is YES, a common data parity error occurred, then the IIU enters the common data bus parity error routine (E0) described above to initiate an error interrupt to the DSP.

If the result of step 159 is NO, no common data bus parity error occurred, then the IIU determines if the fetched word is the first word (word zero) fetched from the control block, step 161. The IIU determines whether the fetched word is the first word fetched from the control block by checking the first word flag in the IIU state machine. The first word flag is in a set condition if the retrieved word is the first word (word zero) fetched from the control block, and is in a reset condition when the first word has already been retrieved.

If the result of step 161 is YES, the fetched word is the first word (word zero) fetched from the control block, then the IIU determines whether the control block is to be skipped and not processed. The IIU determines if the control block is to be skipped by checking to see if the skip bit 121 is set on in the word, step 163. If the result of step 163 is YES, then the IIU skips further processing of the control block by jumping ahead to step 179, described below.

If the result of step 163 is NO, the skip bit is not set on, then the control block is to be processed by the IIU. The IIU then determines if the control block has already been processed or erroneously indicates that it has been processed by checking to see if the complete bit 117 is set, step 165. If the result of step 165 is Yes, then the IIU enters error routine E1 (See FIG. 7A) to report that the control block indicates that it has already been processed. The IIU sets the complete bit on bit 73 in the flag register, step 167. Then the IIU sets the start/-stop bit 55 and the run/-halt bit 79 to zero, step 149 and sends an error interrupt (INT 0) to the DSP, step 151, in the same manner as described above with respect to the common data bus parity error. The IIU then enters the halt mode described above.

Referring back to FIG. 6A, if the result of step 165 is NO, the complete bit is not set to one, then the IIU resets the first word flag to indicate that the subsequent words retrieved from the control block are not the first word (word zero) fetched from the control block, step 169. The fetch routine 155 then loops back to fetch another word from the control block, step 157. The fetch routine retrieves each word from the control block and writes it into the IIU general purpose registers until a copy of the entire control block is loaded into the IIU general purpose registers.

After a copy of the interrupt control block is loaded into the general purpose registers the IIU sends an interrupt request to the host processor, step 171, FIG. 6. The IIU sends an interrupt request to the host processor by setting the interrupt request bit 63 on in the IIU control register 51. Setting the interrupt request bit 63 on causes an external interrupt request to be issued to the host processor.

In response to the interrupt request, the host processor issues a broadcast read to obtain an interrupt vector from the IIU. The IIU provides an interrupt vector to the host processor in response to the broadcast read command. The interrupt vector designates which DSP issued the interrupt request, and includes a copy of the second part of word zero of the interrupt control block designating the interrupt type. The interrupt vector is gated out onto the CFE' bus 21 when the host processor does a broadcast read to get the vector.

Upon a successful broadcast read operation to obtain the interrupt vector, the host processor will perform an access slave write operation to the IIU control register 51 to reset the interrupt request bit 63, thereby clearing the external interrupt request from the IIU to the host processor. The host processor then proceeds to read the IIU general purpose registers to obtain the information provided by the interrupt control block copied in the general purpose registers. Upon completion of reading the general purpose registers, the host processor performs an access slave write operation to the IIU control register 51 to set the interrupt processing complete bit 67 on so that the IIU is notified that the host processor has completed processing the interrupt control block.

If an error occurs in any of the reads performed by the host processor to obtain information from the IIU, the host processor will set the error on access slave read bit 65 in the IIU control register 51. The error on access slave read bit 65, when set, indicates to the IIU that a read error occurred. The host processor will also set the interrupt processing complete bit 67 on in the IIU control register 51 when a read error occurs.

After the IIU sends an interrupt request to the host processor, step 171, the IIU monitors the interrupt processing complete bit 67 to determine when the host processor has completed processing the control block. The IIU checks to see if the interrupt processing complete bit 67 has been set on in the IIU control register 51, step 173. If the result of step 173 is NO, the host processor has not completed processing the interrupt control block, so the IIU loops back to repeat step 173. The IIU will continuously repeat step 173 until the host processor successfully completes processing the control block and sets the interrupt processing complete bit 67 on, or until a read error occurs and the host processor sets the interrupt processing complete bit 67 on.

Figure 7A:
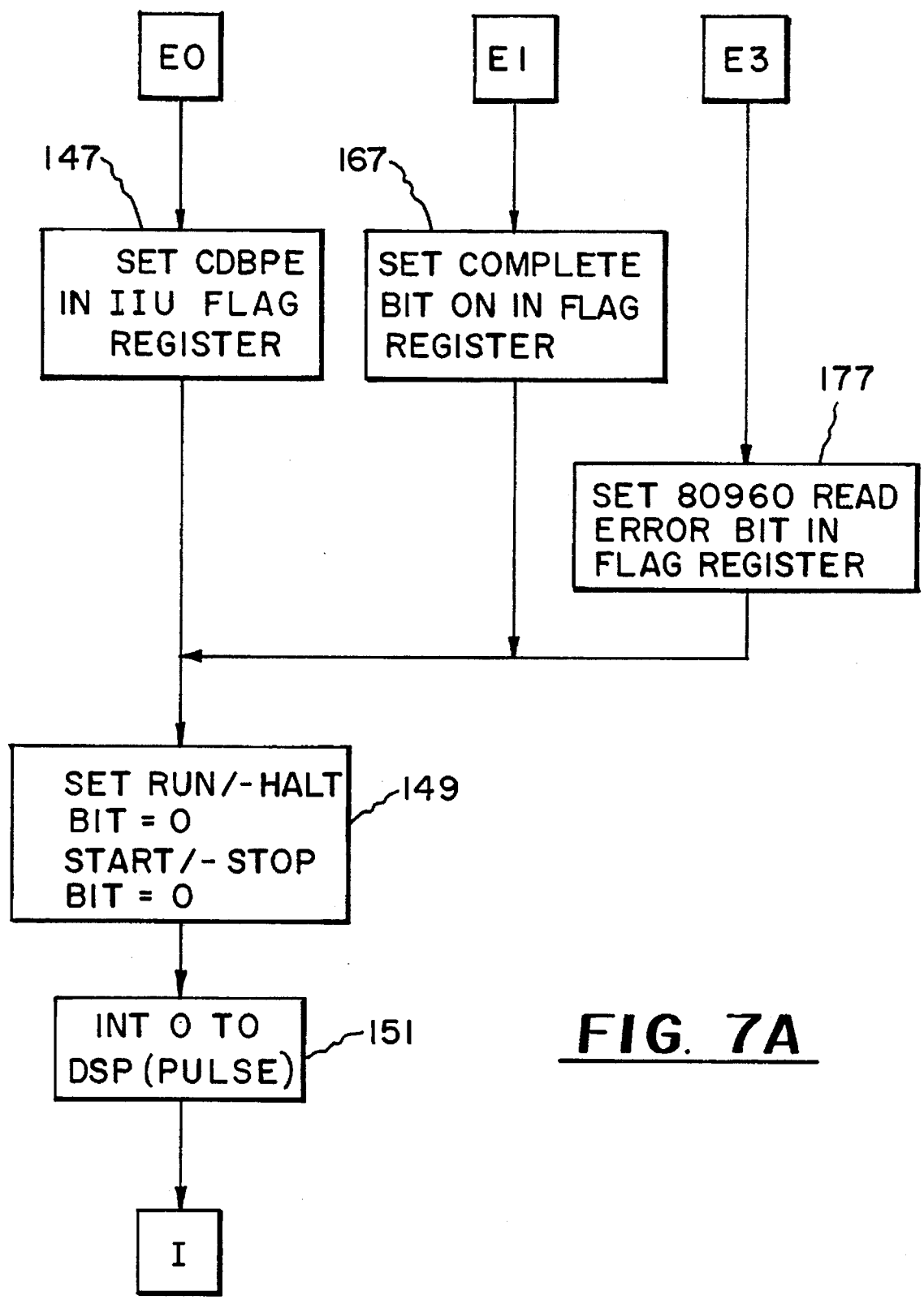

If the result of step 173 is YES, the interrupt processing complete bit is on, the IIU then checks to see if a host processor read error occurred. The IIU determines whether a host processor read error occurred by checking whether the error on slave access read bit 65 has been set, step 175. If the result of step 175 is YES, then the IIU enters the host processor read error routine E3 (FIG. 7A.) The IIU sets the host processor read error bit 75 in the flag register 53 to indicate to the DSP that a host processor read error occurred, step 177. The IIU then sets the start/-stop bit 53 and the run/-halt bit 79 to zero to stop the IIU, step 149, and sends an error interrupt to the DSP, step 151, as described above with respect to the common data bus parity error. The IIU then enters the halt mode described above.

Referring back to FIG. 6, if the result of step 175 is NO, then no host processor read error occurred. Referring to FIG. 7, the IIU sets the complete bit in word zero of the control block in the IIU general purpose registers and then writes word zero from the general purpose registers back to word zero in the control block in the DSP DRAM, step 179. The set complete bit in the control block word zero indicates that the control block has been processed by the IIU and that the host processor has read the control block without an error. The IIU retrieves the DSP DRAM address of word zero of the control block in DSP DRAM from the queue element address holding register 97 so the IIU can write to word zero in the DSP DRAM.

Figure 6A:
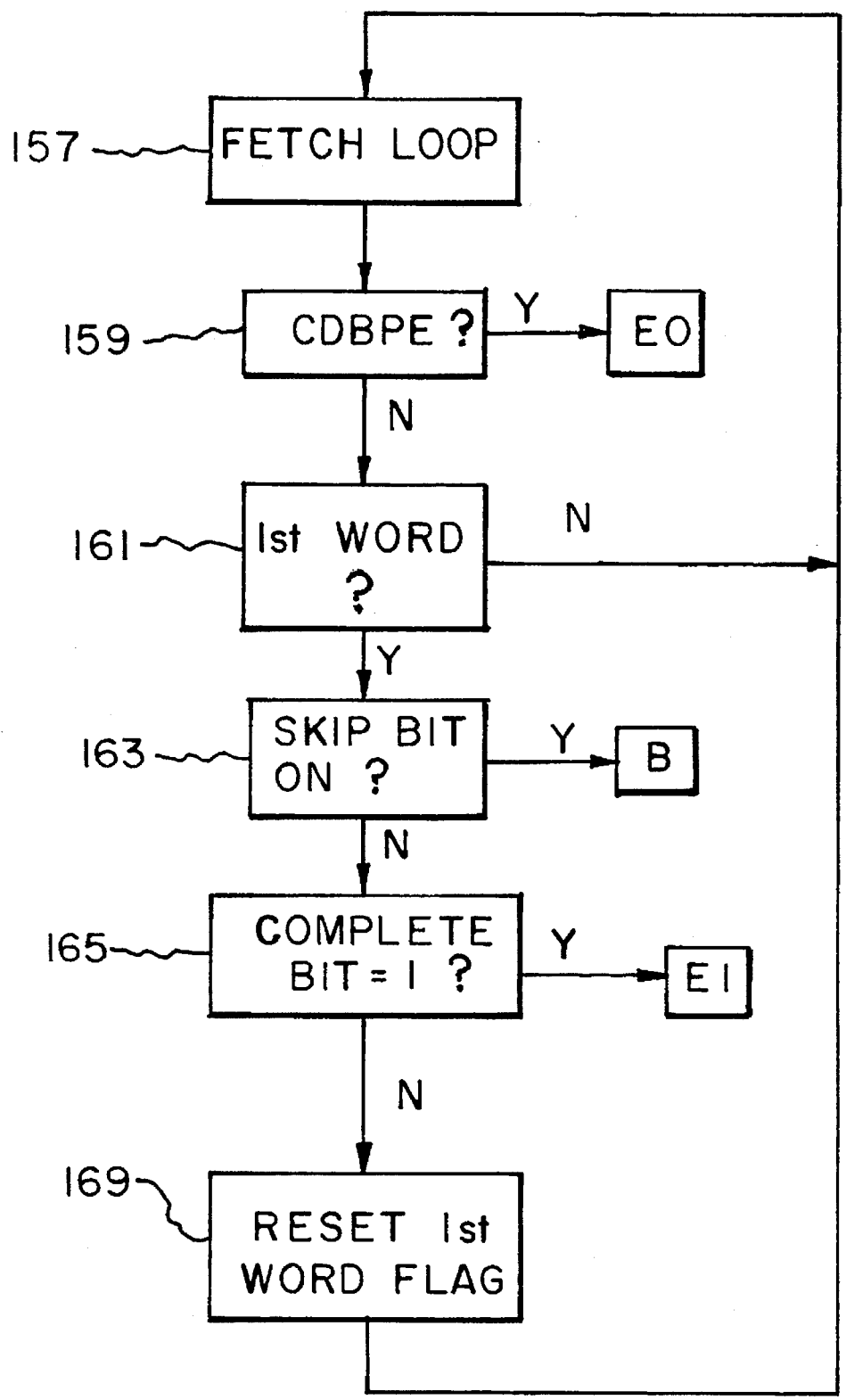

If the skip bit 121 of the control block was on, the IIU jumps from step 163 of FIG. 6A to step 179 without fetching all of the words of the control block and without issuing an interrupt request to the host processor. The IIU sets the complete bit in word zero of the skipped control block to indicate that the skipped control block has been processed by the IIU even though the host processor did not read the control block.

The IIU then determines if the DSP is to be notified upon completion of processing the control block. The DSP will set the interrupt bit 119 in word zero of the control block if the IIU is to notify the DSP that the control block has been processed. The IIU checks to see if the interrupt bit 119 has been set, step 181. If the result of step 181 is YES, then the IIU issues a processing complete interrupt (level 2 interrupt) to the DSP to indicate that the IIU has processed the control block, step 183. The IIU then proceeds to determine if the end of the circular queue buffer 85 has been reached.

If the result of step 181 is NO, the interrupt bit has not been set, the IIU proceeds directly to determine if the end of the circular queue buffer 85 has been reached. The IIU determines whether the address in the hardware pointer register 95 is the same as the end address 91 of the queue buffer 85 stored in the ending address register 89 to determine if the end of the circular queue buffer 85 has been reached, step 185. If the result of step 185 is YES, then the IIU copies the starting queue address 87 from the starting address register 83 into the hardware pointer register 95 so the IIU will loop back to the beginning of the circular queue to retrieve further queue entries, step 89. If the result of step 185 is NO, then the IIU increments the hardware pointer register 95 so the hardware pointer register 95 contains the address of the next queue entry, step 187.

After the IIU places the address of the next queue entry into the hardware pointer register 95 in either step 187 or step 189, the IIU checks to see if further interrupt control blocks are to be processed by checking to see if the start/-stop bit has been set to zero, step 191. If the result of step 191 is YES, then the IIU is to stop processing and enter the halt mode. The IIU sets the run/-halt bit 79 in the flag register 53 to zero to indicate that the IIU is halted, step 193. The IIU then proceeds to enter the halt mode, repeatedly checking the status of the start/stop bit to determine if the start/-stop bit has been set to one to initiate further IIU processing, step 135.

If the result of step 191 is NO, the start/-stop bit has not been set to zero, then further control blocks are to be processed. The IIU loops back to step 139, resetting the first word flag and the general purpose register address counter, and then proceeds to process the next interrupt control block in the same manner as described above.

The foregoing disclosure and the showings made in the drawings are merely illustrative of the principles of this invention and are not to be interpreted in a limiting sense.

We claim:

1. A multi-processing system, comprising:

a) a first processing unit;

b) a second processing unit having a processor which is controlled by a second processing unit operating system or kernel, said second processing unit having a memory, said processor having means for generating interrupts for communication to said first processing unit, said processor comprising means for storing information regarding said interrupts in said memory, said processor comprising means for creating an information address buffer in said memory;

c) a communications channel over which said first and second processing units communicate;

d) said second processing unit having means for processing said interrupts provided by said processor, said means for processing said interrupts operating independent of said processor of said second processing unit and its operating system or kernel, said means for processing said interrupts communicating said interrupts from said second processing unit to said first processing unit over said communications channel, said means for processing said interrupts comprising means for retrieving said information from said memory for communication to said first processing unit, said means for processing said interrupts also comprising means for accessing said information address buffer to retrieve memory addresses of information stored in said memory.

2. The multi-processing system of claim 1, wherein said means for processing said interrupts further comprises means for issuing an interrupt request from said second processing unit to said first processing unit.

3. The multi-processing system of claim 1, wherein said means for processing said interrupts further comprises means for receiving notice from said first processing unit that said first processing unit has completed processing an interrupt request issued by said means for processing said interrupts.

4. The multi-processing system of claim 1, wherein said means for processing said interrupts further comprises means for posting notice to said processor of said second processing trait that said first processing unit has completed processing an interrupt.

5. The multi-processing system of claim 4, wherein:
 a) said means for posting notice is programmable;
 b) said programmable means for posting notice has a first programmable option wherein said means for posting notice interrupts said processor to give said processor notice that said first processing unit has completed processing an interrupt;
 c) said programmable means for posting notice has a second programmable option wherein notice that said first processing unit has completed processing an interrupt is posted to said second processing unit memory which is accessible to said processor.

6. The multi-processing system of claim 1, wherein said means for processing said interrupts further comprises means for selecting information to be issued in an interrupt from said second processing unit to said first processing unit.

7. The multi-processing system of claim 1, wherein said means for processing said interrupts further comprises means for receiving high priority interrupts, said means for receiving high priority interrupts halting operation of said means for processing of said interrupts upon receiving a high priority interrupt.

8. The multi-processing system of claim 1, wherein said means for processing said interrupts further comprises means for issuing an interrupt vector to said first processing unit upon receiving a broadcast read command from said first processing trait, where said interrupt vector identifies said second processing unit and identifies an interrupt type.

9. A method of processing interprocessor interrupts in a multi-processing system comprising a first processing unit, a second processing unit having a processor and a memory, said processor generating interrupts for communication to said first processing unit, and a communications channel over which said first and second processing units communicate, comprising the steps of:
 a) providing an interrupt unit that operates independently of said processor;
 b) storing information regarding said interrupts in said memory by said processor, said stored information having addresses in said memory, and storing said addresses in an information address buffer in said memory;
 c) accessing said information address buffer to retrieve said addresses of information stored in said memory by said interrupt trait;
 d) retrieving said information from said memory for communication to said first processing unit by said interrupt unit;
 e) processing said information in said interrupt unit so as to communicate said interrupts from said second processing unit to said first processing trait over said communications channel.

10. The method of claim 9 further comprising the step of operating said processor to perform tasks unrelated to said interrupts at the same time that said interrupt unit processes said information.

11. The method of claim 9, further comprising the steps of:
 a) providing skip information for one of said interrupts in said memory by said processor, said skip information indicating that said respective interrupt with said skip information is not to be processed in said interrupt unit;
 b) said step of retrieving information from said memory further comprises the steps of retrieving said information for one of said interrupts, then determining if said retrieved information has said skip information, and if so then retrieving said information for a next one of said interrupts.

12. The method of claim 11, wherein:
 a) said step of storing information regarding said interrupts in said memory further comprises the step of, for each of said interrupts, storing said information in one or more words;
 b) said step of providing skip information for one of said interrupts further comprises the step of providing said skip information in one of said words;
 c) providing said skip information in a residual word while said interrupt unit is operating, said residual word being an image of said one word.

* * * * *